United States Patent
Zytkovicz et al.

[11] Patent Number: 5,056,528
[45] Date of Patent: Oct. 15, 1991

[54] PRESSURE GAUGE: GELATINOUS FILLED BOURDON TUBE

[75] Inventors: Duane Zytkovicz, Onamia; Thomas J. McEvoy, Minnetonka, both of Minn.

[73] Assignee: Angeion Corporation, Plymouth, Minn.

[21] Appl. No.: 568,085

[22] Filed: Aug. 16, 1990

[51] Int. Cl.[5] .................................................. G01L 7/04
[52] U.S. Cl. ........................................ 128/741; 73/741
[58] Field of Search .................. 128/672; 73/732, 733, 73/734, 735, 736, 737, 738, 739, 740, 741, 742, 743

[56] References Cited

U.S. PATENT DOCUMENTS

| | | | |
|---|---|---|---|
| 3,338,101 | 8/1967 | Krasnitz et al. | 73/411 |
| 3,407,665 | 10/1968 | Noakes et al. | 73/418 |
| 3,605,500 | 9/1971 | Trekell | 73/398 |
| 3,641,820 | 2/1972 | Bissell | 73/418 |
| 3,776,041 | 12/1973 | Wetterhorn | 73/414 |
| 3,789,668 | 2/1974 | Bissell | 73/418 |
| 3,807,232 | 4/1974 | Wetterhorn | 73/418 |
| 3,815,421 | 6/1974 | Harland et al. | 73/418 |
| 3,857,219 | 12/1974 | Bissell | 53/37 |
| 3,975,967 | 8/1967 | Conti | 73/411 |
| 4,646,406 | 3/1987 | Weiss et al. | 73/741 |
| 4,690,000 | 9/1987 | Schmaus | 73/741 |
| 4,790,821 | 12/1988 | Stines | 604/98 |

Primary Examiner—William E. Kamm
Assistant Examiner—Scott R. Akers
Attorney, Agent, or Firm—Hugh D. Jaeger

[57] ABSTRACT

A pressure gauge including a bourdon tube where a substantial portion of the pressure gauge is filled with a silicone gel, gelatinous material, or any other suitable materials.

2 Claims, 1 Drawing Sheet

PRESSURE GAUGE: GELATINOUS FILLED BOURDON TUBE

BACKGROUND OF THE INVENTION

1. Field of the Invention

The present invention relates to a pressure gauge, and more particularly, pertains to a pressure gauge substantially filled with silicone gel, gelatinous material, or any other suitable materials for medical and other applications.

2. Description of the Prior Art

Hollow bourdon tube pressure gauges inherently have several problems in medical applications. First, due to the shape of the bourdon tube, it is very difficult to purge the air from the tube and replace it with a liquid. Air in the tube makes the system compliant so that added work must be done to compress the trapped air. Also, the trapped air being compressible stores energy, so if system failure occurs, this energy is suddenly released in an uncontrolled manner. In the present invention, a gel substance completely displaces the air in the tube so that no purging of the gauge is required.

Second, the standard manufacturing method for fabricating these pressure gauges is to seal the bourdon tube and also join the tube to the gauge base by soldering or brazing. Solder, an alloy of lead and tin, also contains trace amounts of other heavy metals such as antimony and/or cadmium. In medical applications, these heavy metals are known toxins which can significantly affect physiological function.

These types of gauges are used in numerous medical applications ranging from relatively remote to intimate contact with patients and/or patient fluid. For instance, these gauges are used to monitor the internal pressures of the balloon used to dilate blood vessels as in an angioplasty procedure. The only barrier between direct fluid contact between the gauge and patient is the balloon itself. If the balloon or catheter were to rupture and/or leak when the system is pressurized, and there is any air in the gauge tube, then there is an energy source to drive contaminates out of the gauge and into the patient. Even in the absence of air in the gauge tube, diffusion can move contaminates into the patient. In the present invention, the gel substance traps the contaminate in the gauge tube and prevents their migration to the patient.

Third, even in remote sensing applications, the gel filled gauge tube has a greatly reduced surface area exposed to the working fluid which eliminates the dead space or volume of the gauge tube which can harbor microbial growth. Oil filled bourdon tube gauges with an isolating diaphragm are used in many applications where the same issues as described above need to be addressed. However, these isolating diaphragms need to have a large surface area to counteract the diaphragm's inherent stiffness which ca compromise the sensitivity and accuracy of the gauge. In the present invention, the gel substance gives isolation without the need for a large surface area isolating diaphragm. This is advantageous in a system where size is critical.

In many medical applications, the system's working fluid is a saline solution with is highly corrosive to most metals. Also, the saline solution could induce electrolysis inside the bourdon tube due to the dissimilar metals used in its fabrication. This electrolysis can put heavy metal ions into solution with the saline working fluid. In the present invention, the gel substance prevents the saline solution from contracting the inside of the bourdon tube.

A current process of providing a gauge suitable for medical applications is to flush the interior of the tube with organic solvents and then install a porous filter into the entrance port of the gauge tube. This process reduces but does not eliminate the contaminates in the gauge tube. A porous filter in the prior art pressure gauges makes it more difficult to purge the air from the tube.

The present invention overcomes the disadvantages of the prior art by providing a pressure gauge including a bourdon tube substantially filled with a silicone gel, gelatinous material, or any other suitable materials for medical or other applications.

SUMMARY OF THE INVENTION

The general purpose of the present invention is a hollow bourdon tube pressure indicating gauge with a gel substance which substantially fills the internal volume of the tube, and isolates materials on the inside of the tube from the pressurizing system fluid without effecting the functioning of the gauge relative to its calibration.

According to one embodiment of the present invention, there is provided a pressure gauge with a bourdon tube substantially filled with a gelatinous material or any other suitable material.

Significant aspects and features of the present invention include:

a. no air to purge from the gauge or gauge tube;

b. the silicone gel in the gauge isolates and insulates contaminates from the working fluid;

c. the silicone gel does not compromise accuracy or functioning of the gauge;

d. the silicone gel is simple, compact, and does not increase the size of the gauge or the gauge system;

e. the silicone gel is cost effective—the silicone gel filling of gauge tube can be done simply at low cost, least time and motion;

f. the silicone gel is chemically inert and biocompatible; and, g. the silicone gel reduces dynamic effects to the gauge and the gauge system due to sudden pressure changes.

Having thus described embodiments of the present invention, it is a principal object hereof to substantially replace all of the air on the inside of a bourdon tube of a pressure gauge with a silicone gel, gelatinous material, or any other suitable materials.

One object of the present invention is to ensure that the silicone gel substantially replaces the air. Any air in the bourdon tube will cause the calibration of the gauge to be affected. The silicone gel substance must be a very flexible gel so as not to affect the movement of the bourdon tube. One such typical gel is a two part silicone, such as the type sold under the tradename Q7-2218 Silicone Gel System by Dow Corning in Midland, Mich. BRIEF DESCRIPTION OF THE DRAWING Other objects of the present invention, and many of the attendant advantages of the present invention, will be readily appreciated as the same becomes better understood by reference to the following detailed description when considered in connection with the accompanying drawing, in which like reference numerals designate like parts throughout the figure thereof and wherein:

FIG. 1 illustrates a back view of a pressure gauge substantially filled with a silicone gel, gelatinous material, or any other suitable materials.

DESCRIPTION OF THE PREFERRED EMBODIMENTS

Figure 1:
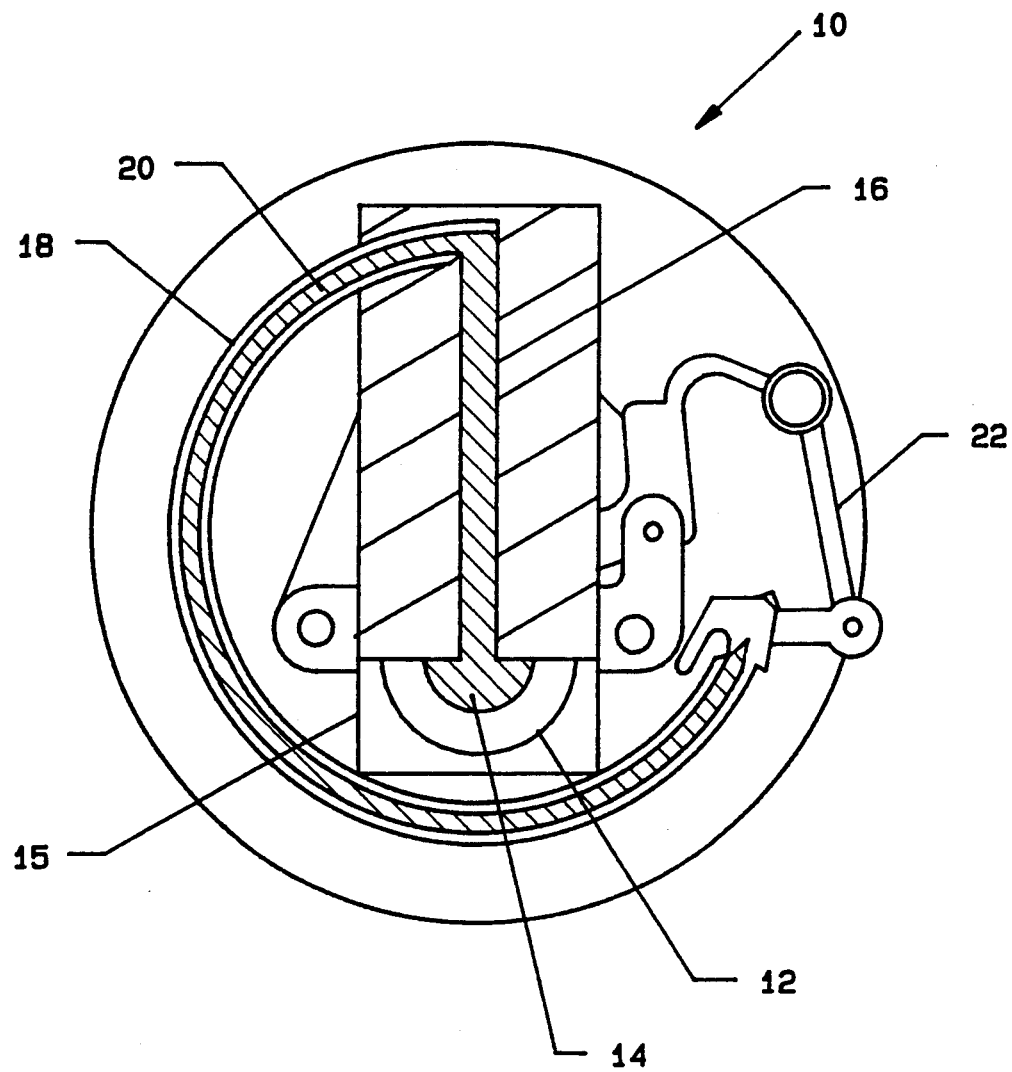

FIG. 1 illustrates a back view of a pressure gauge 10, partially in cross section including a silicone gel, gelatinous material, or any other suitable materials substantially filling or completely filling predetermined components of a threaded nipple end 12, a bore 14 in a block 15, a connecting channel 16 and a bourdon tube 18. A standard pointer registering structure 20 connects to the bourdon tube 18. A silicone gel or polymeric material 20 substantially or completely internally fills elements 12-18.

MODE OF OPERATION

The silicone gel, gelatinous material, or any other suitable materials is introduced into the bourdon tube and connecting components 12-14 of the pressure gauge while in a liquid state. After curing, the silicone gel is formed. Since the silicone gel does not flow, it remains in the tube even when the gauge port is inverted.

In use, the gauge is installed in a normal fashion. System pressure acts on the face of the silicone gel. Since the silicone gel is incompressible yet deformable, the pressure is transmitted by the silicone gel to the bourdon tube which deflects in a normal manner. A gear linkage system 20 amplifies the movement of the bourdon tube to move a pointer that indicates the system pressure.

The silicone gel is of orders of magnitude more flexible than the bourdon tube so the function and operation of the pressure gauge is not affected in any way. The gauge behaves and operates as if the gauge was liquid fluid. One difference is that the silicone gel does not run out after curing.

The pressure gauge, filled with a material, particularly lends itself to use in medical procedures, more particularly angioplasty procedures.

Various modifications can be made to the present invention without departing from the apparent scope hereof.

I claim:
1. A pressure gauge comprising:
   a) a bore,
   b) a bourdon tube,
   c) a tube means connecting said bore and said tube,
   d) indicating means connected to said bourdon tube for indicating pressure at said bore and,
   e) a resilient gelatinous material that is incompressible yet deformable and that at least almost completely fills the bourdon tube.
2. A process of isolating the bourdon tube of a bourdon tube type pressure gauge from a pressure system comprising the step of.
   a) completely or almost completely filling the bourdon tube with a resilient gelatinous material that is incompressible yet deformable.

* * * * *